US008649688B2

(12) United States Patent
McGhan et al.

(10) Patent No.: US 8,649,688 B2
(45) Date of Patent: Feb. 11, 2014

(54) RADIO FREQUENCY DRIVE LEVEL CONTROL SYSTEM AND METHOD FOR AN ELECTRO-OPTIC PHASE MODULATOR

(75) Inventors: Douglas L. McGhan, Ottawa (CA); Ian B. Betty, Ottawa (CA)

(73) Assignee: Ciena Corporation, Hanover, MD (US)

( * ) Notice: Subject to any disclaimer, the term of this patent is extended or adjusted under 35 U.S.C. 154(b) by 385 days.

(21) Appl. No.: 13/016,161

(22) Filed: Jan. 28, 2011

(65) Prior Publication Data

US 2012/0194287 A1 Aug. 2, 2012

(51) Int. Cl.
*H04B 10/04* (2011.01)
(52) U.S. Cl.
USPC ............ 398/188; 398/183; 398/198; 359/279
(58) Field of Classification Search
USPC .................................. 398/182–201; 359/279
See application file for complete search history.

(56) References Cited

U.S. PATENT DOCUMENTS

| | | | |
|---|---|---|---|
| 6,539,038 B1 | 3/2003 | Wilkerson, Jr. et al. | |
| 6,795,594 B2 | 9/2004 | Betty | |
| 6,813,448 B1* | 11/2004 | Chiappetta | 398/158 |
| 6,842,587 B1 | 1/2005 | McGhan et al. | |
| 7,023,601 B2 | 4/2006 | McGhan et al. | |
| 7,783,269 B2 | 8/2010 | Vinayak et al. | |
| 7,787,778 B2 | 8/2010 | Harley et al. | |
| 2005/0169402 A1* | 8/2005 | Niwa et al. | 375/298 |
| 2007/0133918 A1* | 6/2007 | Cho et al. | 385/1 |
| 2007/0274731 A1 | 11/2007 | Boffi et al. | |
| 2009/0252502 A1* | 10/2009 | Zhu | 398/188 |
| 2010/0135656 A1* | 6/2010 | Khurgin et al. | 398/43 |
| 2010/0254715 A1* | 10/2010 | Yamashita et al. | 398/188 |
| 2010/0272446 A1 | 10/2010 | Harley et al. | |

* cited by examiner

*Primary Examiner* — M. R. Sedighian
(74) *Attorney, Agent, or Firm* — Clements Bernard PLLC; Christopher L. Bernard; Lawrence A. Baratta, Jr.

(57) ABSTRACT

The present disclosure provides Radio Frequency (RF) drive level control systems and methods for an Electro-Optic (EO) M-ary Phase-Shift Keying (M-PSK) phase modulator. Specifically, an M-PSK drive waveform is tightly controlled for maximum symmetry in the associated constellation. In an exemplary embodiment, the present disclosure includes an M-PSK transmitter, an M-PSK electro-optic phase modulator, and phase modulation method that each control RF drive level based upon a carrier suppression ratio defined as a measure of ratio of a modulated time-averaged E-field to the magnitude of the E-field. In an exemplary embodiment, the carrier suppression ratio is measured based on a modulation depth measurement.

12 Claims, 11 Drawing Sheets

RADIO FREQUENCY DRIVE LEVEL CONTROL SYSTEM AND METHOD FOR AN ELECTRO-OPTIC PHASE MODULATOR

FIELD OF THE INVENTION

The present invention relates generally to optical modulation. More particularly, the present invention relates to Radio Frequency (RF) drive level control systems and methods for an Electro-Optic (EO) M-ary Phase-Shift Keying (M-PSK) phase modulator.

BACKGROUND OF THE INVENTION

Conventionally, direct optical phase modulators are an attractive alternative for generating constant envelope optical phase modulated data signals for use in fiber optic transmission. With appropriate multi-level RF driving signals, optical phase modulators can be used to generate M-PSK optical signals. The RF drive level of high speed optical phase modulators cannot be controlled by detecting the optical intensity at the output because the optical intensity does not change with the RF driving voltage. RF drive level control of optical phase modulators may be achieved by monitoring the RF signal level directly with a diode based RF peak detector circuit. This can be done by diverting a portion of the RF drive signal to the RF peak detector circuit. The RF drive level would be controlled to a calibrated level which would be based on the measured phase response of the optical phase modulator. However, this RF peak detector-based control approach has several limitations including 1) requiring accurate measurement of EO modulator phase response, 2) requiring calibration of the target RF drive level to account for changes in the EO modulator phase response over wavelength and/or temperature, and 3) requiring additional RF signal to accommodate the portion of signal diverted to the RF peak detector circuit. Disadvantageously, errors in calibration of either the EO response or the RF peak detector circuit result in error to the phase modulator levels. Further, diversion of a portion of the RF signal to RF peak detectors also adds unwanted parasitic loading to the RF signal thereby degrading the signal integrity.

BRIEF SUMMARY OF THE INVENTION

In various exemplary embodiments, the present disclosure describes RF drive level control systems and methods for an EO M-PSK phase modulator. Specifically, an M-PSK drive waveform is tightly controlled for maximum symmetry in the associated constellation. RF drive level control is needed to track changes in RF driver gain, modulator half-way voltage (Vpi), and digital-analog converter (DAC) swing over temperature and aging. In an exemplary embodiment, the present disclosure includes an M-PSK transmitter, an M-PSK electro-optic phase modulator, and phase modulation method that each control RF drive level based upon a carrier suppression ratio defined as a measure of ratio of a modulated time-averaged E-field to the magnitude of the E-field. In an exemplary embodiment, the carrier suppression ratio is measured based on a modulation depth measurement.

In an exemplary embodiment, a phase modulation method includes phase modulating a laser source with a drive signal; measuring a carrier suppression ratio of an output of the phase modulated laser source; and controlling the drive signal based upon the carrier suppression ratio. The drive signal may include a M-ary Phase Shift Keying signal. The phase modulation method may further include providing the laser source to a modulator. The phase modulation method may further include splitting a portion of the laser source prior to the modulator and providing the portion to a low frequency probe phase modulator; combining an output of the low frequency probe phase modulator with a portion of an output of the modulator; and converting the combined output to an electrical signal. The phase modulation method may further include determining modulation depth from the electrical signal, wherein the modulation depth is utilized to determine the carrier suppression ratio. The phase modulation method may further include determining modulation depth from the electrical signal; and controlling the drive signal based on a difference between the modulation depth from a modulation depth target. The carrier suppression ratio may include a modulated time-averaged E-field divided by a magnitude of the E-field.

In another exemplary embodiment, an electro-optic phase modulation system includes a modulator; a modulator driver configured to drive the modulator with a Radio Frequency drive signal; and a drive level control circuit configured to monitor a portion of an output of the modulator and to control the Radio Frequency drive signal based thereon. The Radio Frequency drive signal may include a M-ary Phase Shift Keying signal. The modulator may be configured to measure a carrier suppression ratio. The carrier suppression ratio may include a modulated time-averaged E-field divided by a magnitude of the E-field. The carrier suppression ratio may be determined based on measured modulation depth. The modulator may be configured to measure the measured modulation depth through optical interference. Optionally, the modulator includes a first splitter configured to split a laser source to a phase modulator and a low frequency probe; a second splitter configured to split an output of the phase modulator to a modulator output and a combiner; the combiner configured to combine an output of the low frequency probe and the split output of the phase modulator; and a photodiode connected to the combiner providing an electrical signal to the drive level control circuit. The drive level control circuit may be configured to determine modulation depth from the electrical signal and compare the modulation depth to a target depth for controlling the Radio Frequency drive signal.

In yet another exemplary embodiment, an M-ary Phase-Shift Keying transmitter includes a laser source; a phase modulator configured to modulate the laser source based on a Radio Frequency drive signal; and a feedback control circuit configured to control the Radio Frequency drive signal based upon carrier leakage at an output of the phase modulator. The M-ary Phase-Shift Keying transmitter may further include a first splitter configured to split the laser source to the phase modulator and a low frequency probe; a second splitter configured to split an output of the phase modulator to a transmitter output and a combiner; the combiner configured to combine an output of the low frequency probe and the split output of the phase modulator; and a photodiode connected to the combiner providing an electrical signal to the feedback control circuit. Optionally, the phase modulator includes a non-linear phase modulator, and the feedback control circuit is further configured to control bias voltage of the non-linear phase modulator.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

In various exemplary embodiments, the present disclosure describes RF drive level control systems and methods for an EO M-PSK phase modulator. Specifically, an M-PSK drive waveform is tightly controlled for maximum symmetry in the associated constellation. RF drive level control is needed to track changes in RF driver gain, modulator halfway voltage (Vpi), and digital-analog converter (DAC) swing over temperature and aging. In an exemplary embodiment, the present disclosure includes an M-PSK transmitter, an M-PSK electro-optic phase modulator, and phase modulation method that each control RF drive level based upon a carrier suppression ratio defined as a measure of ratio of a modulated time-averaged E-field to the magnitude of the E-field. In an exemplary embodiment, the carrier suppression ratio is measured based on a modulation depth measurement.

Figure 1:
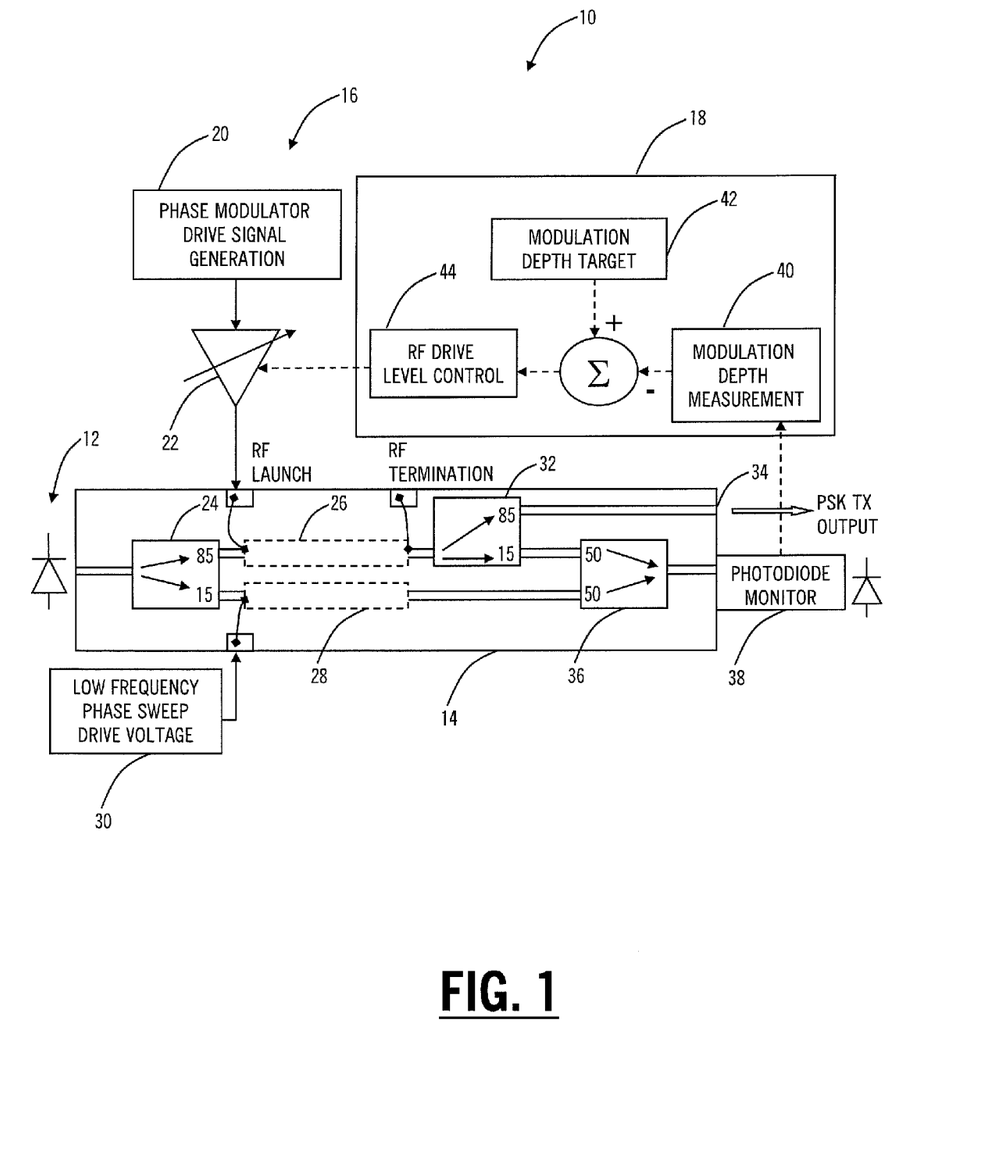
FIG. 1 is a block diagram of an exemplary M-PSK transmitter with carrier leakage control of RF drive level.

Referring to FIG. 1, in an exemplary embodiment, a block diagram illustrates an exemplary M-PSK transmitter 10 with carrier leakage control of RF drive level. The present disclosure utilizes optical interference and detectors for a carrier leakage measurement and adjustment of the RF drive level based thereon. The 4-PSK transmitter 10 is presented for illustration purposes and those of ordinary skill in the art will recognize the carrier leakage control of RF drive level contemplates use with any M-PSK modulator. The M-PSK transmitter 10 includes a laser 12 such as a continuous wave (CW) laser, an optical phase modulator 14, a modulator driver 16, and an RF drive level control circuit 18. Functionally, the laser 12 emits a continuous laser that is phase modulated by the optical phase modulator 14 based upon signals from the modulator driver 16 with the RF drive level control circuit 18 providing a feedback loop to control RF drive level in the optical phase modulator 14 based upon carrier leakage measurements.

The RF drive level of the optical phase modulator 14 for generation of M-PSK optical signals should be adjusted for optimum spacing between constellation points on the complex plane. In the example of FIG. 1 for 4-PSK, the M-PSK transmitter 10 requires control of a 4-level RF drive signal provided by a phase modulator drive signal generator 20. In this example, the objective is to produce four equally spaced phases on the complex optical plane. The control of the 4-level RF drive signal may be performed at a modulator driver 22 through the RF drive level control circuit 18. Insufficient or excessive RF drive level results in unequal spacing of the optical phases. For example, 10% under-drive of a 4-PSK signal would result in phase spacing of [81, 81, 81, 117] degrees and 10% over-drive would result in phase spacing of [99, 99, 99, 63] degrees.

For a given optical phase modulation format, there exists a distribution of optical phase values. The present disclosure exploits the fact that the modulated phase distribution depends on the RF drive waveform and level. The time-averaged optical E-field can be represented by a single vector. The magnitude of that vector depends on the distribution of optical phase. As an example, a uniform phase distribution across the range of {−180, 180} degrees results in a time-averaged E-field vector of zero magnitude. This condition is referred to as "suppressed-carrier" modulation. The magnitude of the time-averaged E-field vector relative to the magnitude of the E-field at any given time (for pure phase modulation) can be expressed as "carrier suppression". Accordingly, the present disclosure proposes to measure the ratio of the modulated time-averaged E-field to the magnitude of the E-field, otherwise referred to as the "carrier suppression ratio". This metric is then used to accurately control the RF driving waveform level.

In an exemplary embodiment, the carrier suppression ratio may be measured and calculated using the optical phase modulator 14 and the RF drive level control circuit 18. For example, the carrier suppression ratio can be measured by interfering and detecting the phase modulated light with a portion of light from the same laser source which is not modulated. The M-PSK transmitter 10 may include a splitter 24 configured to split an output of the laser 12 to an RF phase modulator 26 and a low frequency probe phase modulator 28. The splitter 24 is configured to split the majority of the output to the RF phase modulator 26 and the remainder to the low frequency probe phase modulator 28, such as, for example 85% to the RF phase modulator 26 and 15% to the low frequency probe phase modulator 28. The RF phase modulator 26 is configured to modulate the laser output based on the 4-level RF drive signal received from the modulator driver 22.

The phase of the un-modulated light can be swept at low frequency by the low frequency probe phase modulator 28 through a low frequency sweep drive voltage 30. A modulated output from the RF phase modulator 26 can be split again via a splitter 32 which connects a majority of the modulated output to a transmitter output 34 and the remainder to a combiner 36, such as, for example 85% to the transmitter output 34 and 15% to the combiner 36. The combiner 36 combines the remainder of the modulated output signal with an output of the low frequency probe phase modulator 28 and connects to a photodiode monitor 38 which measures modulation depth of the resultant signal from the combiner 36. The modulation depth is provided to the RF drive level control circuit 18 and can be used to accurately measure the carrier suppression ratio and therefore the resultant phase drive level of the high speed modulated signal.

The measured carrier suppression ratio is provided to the RF drive level control circuit 18 providing a modulation depth measurement 40. The modulation depth measurement 40 may include a high resolution electrical spectrum analyzer that is configured to measure the carrier suppression ratio from the output of the photodiode monitor 38. The modulation depth measurement 40 is subtracted from a modulation depth target 42 to provide an RF drive level control 44 which is provided to the modulator driver 22. This carrier leakage control method provides a very accurate method of controlling the phase modulation level in the optical phase modulator 14 or any other electro-optic phase modulator. Unlike the indirect method of controlling the RF drive level using RF peak detectors, this method directly measures phase modulation level which benefits the phase modulated transmitter performance. Also, this method is not impaired by changes to the electro-optic phase coefficient over transmitter wavelength or temperature.

Figure 2:
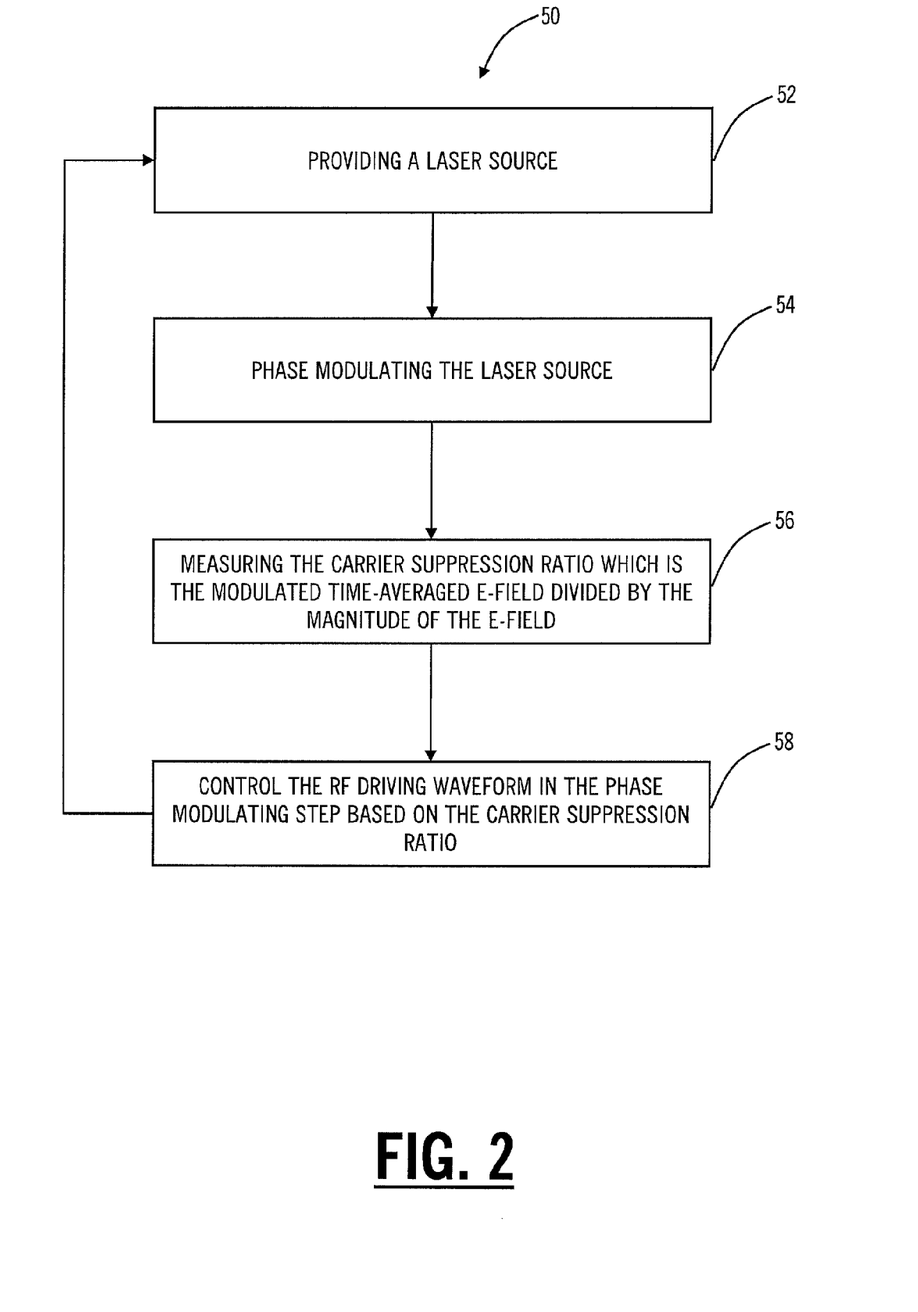
FIG. 2 is a flowchart of a RF drive level control method for an M-PSK electro-optic phase modulator.

Referring to FIG. 2, in an exemplary embodiment, a flowchart illustrates a RF drive level control method 50 for an M-PSK electro-optic phase modulator. The RF drive level control method 50 provides a laser source (step 52) and phase modulates the laser source (step 54). The carrier suppression ratio is measured on the output of the phase modulated laser source (step 56), and the RF driving waveform in the phase modulating step is controlled based on the carrier suppression ratio (step 58). The carrier suppression ratio is defined as the modulated time-averaged E-field divided by the magnitude of the E-field.

With respect to measurement of the carrier leakage, carrier suppression ration, etc., conventional optical spectrum analyzers do not have high enough resolution to directly measure carrier leakage. As described herein, measurement of carrier leakage can be done using a heterodyne technique where a portion of the un-modulated laser power is frequency offset and then combined with the modulated signal on a photo-detector. The output of the photo-detector is then measured using a high resolution electrical spectrum analyzer. The power of the tone at the frequency offset relative to the power of the rest of the spectrum provides a measure of carrier leakage. Polarization must be maintained between the modulated signal and the frequency offset un-modulated light. In theory, the carrier leakage can also be estimated using a digital coherent receiver. Provided sufficient sampling (Nyquist), the average of the recovered signal (following clock recovery, polarization recovery and optical phase recovery) is a measure of the carrier leakage.

Figure 3:
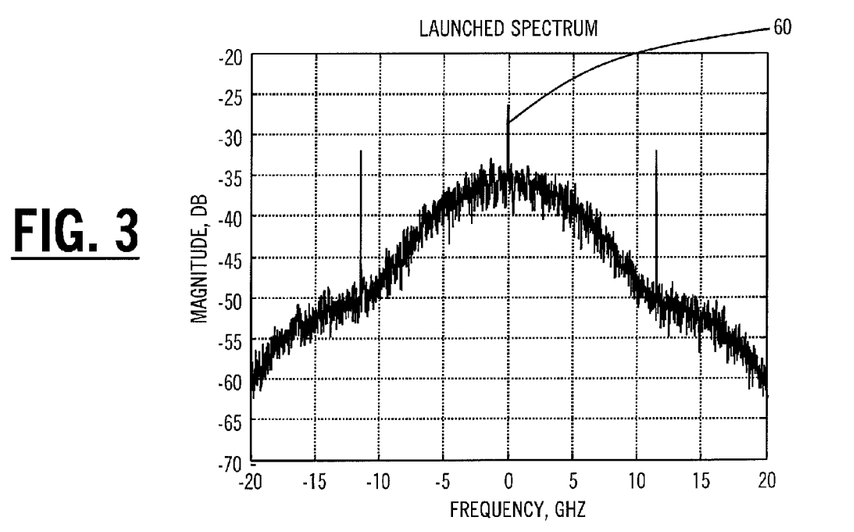
FIG. 3 is a graph of launched spectrum, frequency versus magnitude, showing an example of a 4-PSK transmitter spectrum where the phase modulator is driven to provide equal phase spacing for the four optical constellation points.
Figure 4:
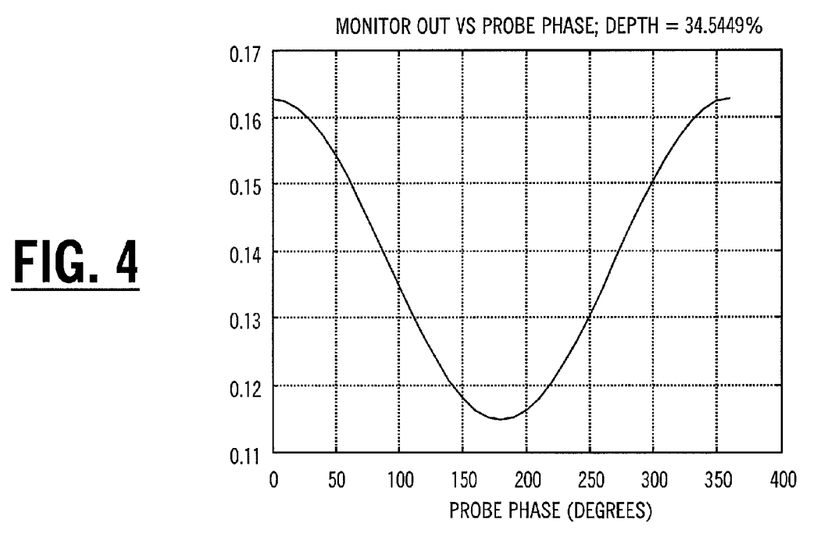
FIG. 4 is a graph of measured modulation depth on a photodiode after interference with an un-modulated light probe for the 4-PSK transmitter spectrum of FIG. 3.

Referring to FIGS. 3 and 4, in exemplary embodiments, graphs illustrate an example of carrier leakage measurement. Specifically, FIG. 3 illustrates a graph of launched spectrum—frequency (GHz) versus magnitude in dB with exemplary carrier leakage 60. FIG. 3 shows an example of a 4-PSK transmitter spectrum where the phase modulator is driven to provide equal phase spacing for the four optical constellation points. In this condition, the optical carrier (zero frequency tone) in the measured spectrum is shown. FIG. 4 illustrates measured modulation depth on a photodiode (e.g., the photodiode monitor 38, also referred to herein as a monitor probe) after interference with an un-modulated light probe. FIG. 4 shows the detected optical intensity versus the optical phase of the monitor probe. The maximum and minimum values correspond to constructive and destructive interference between the leaked optical carrier of the modulated signal and the un-modulated probe. The depth of the intensity response to the probe phase provides a measurement of the carrier leakage. In the exemplary embodiment, a depth of 34.55% corresponds to the carrier magnitude seen in FIG. 3.

Figure 5:
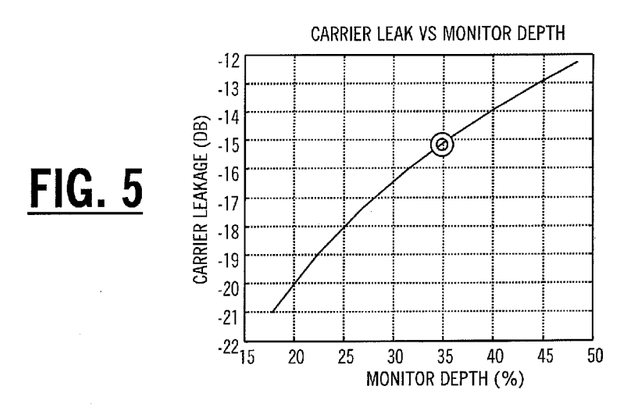
FIG. 5 is a graph of carrier leakage versus monitor depth showing the relationship between carrier leakage and the depth of the optical intensity detected when the modulated signal is interfered with the phase swept optical probe for the 4-PSK transmitter spectrum of FIG. 3.
Figure 6:
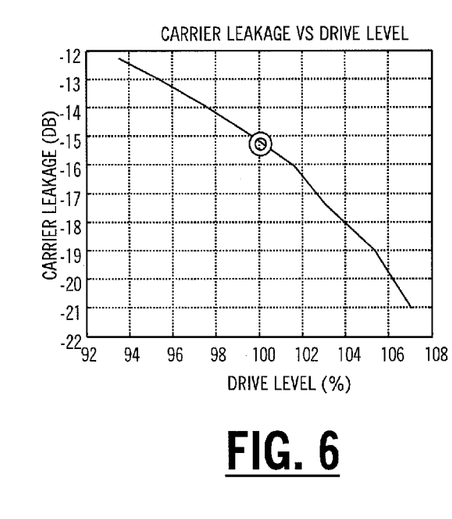
FIG. 6 is a graph of carrier leakage versus drive level showing a strong monotonic relationship between carrier leakage and RF drive level for the 4-PSK transmitter spectrum of FIG. 3.
Figure 7:
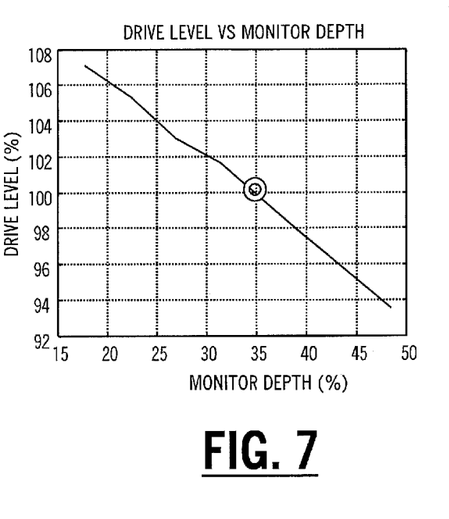
FIG. 7 is a graph of drive level versus monitor depth showing the relation between the normalized RF drive level and the measured monitor depth for the 4-PSK transmitter spectrum of FIG. 3.

Referring to FIGS. 5, 6, and 7, in exemplary embodiments, various graphs illustrate that carrier leakage is a strong indicator of phase drive level. Low frequency phase sweeps of un-modulated light interfered with a transmitter output, detected with photodiode monitors can be used to measure carrier leakage in service and monitor signal (modulation depth) is very insensitive to tap/coupler errors. Specifically, FIG. 5 is a graph of carrier leakage versus monitor depth, FIG. 6 is a graph of carrier leakage versus drive level, and FIG. 7 is a graph of drive level versus monitor depth. FIG. 5 shows the relationship between carrier leakage and the depth of the optical intensity detected when the modulated signal is interfered with the phase swept optical probe. Note that in the case of a carrier suppressed modulated signal, a depth of 0% on the monitor would be expected. FIG. 6 shows a strong monotonic relationship between carrier leakage and RF drive level. In the example of 4-PSK with equal constellation spacing, it is seen that target carrier leakage is between −15 dB and −16 dB. FIG. 7 shows the relation between the normalized RF drive level and the measured monitor depth. This illustrates a well-behaved monotonic control surface that can be used for closed-loop control of RF drive level controlling to a target monitor depth.

Figure 8:
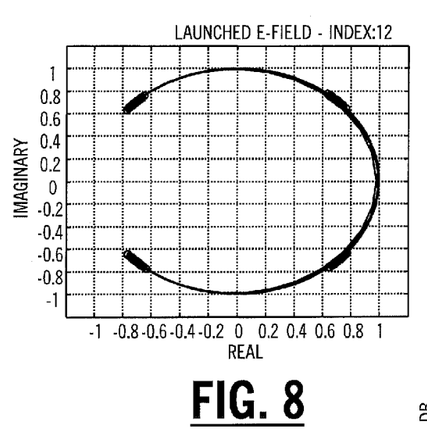
FIG. 8 is a graph of a complex plane of the launched E-field for a 4-PSK signal with an ideal RF drive level.
Figure 9:
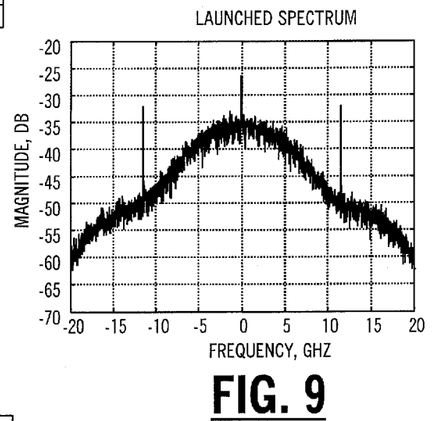
FIG. 9 is a graph of launched spectrum, frequency versus magnitude, showing the 4-PSK signal with an ideal RF drive level of FIG. 8.
Figure 10:
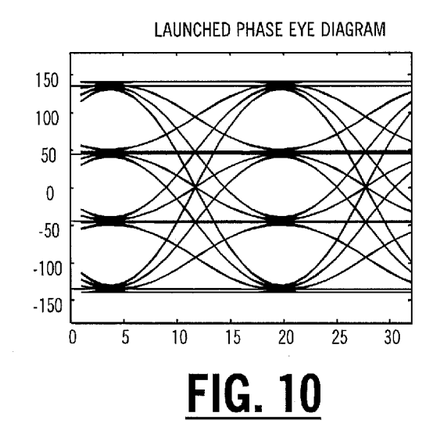
FIG. 10 is graph of the launched phase eye diagram showing the 4-PSK signal with an ideal RF drive level of FIG. 8.
Figure 11:
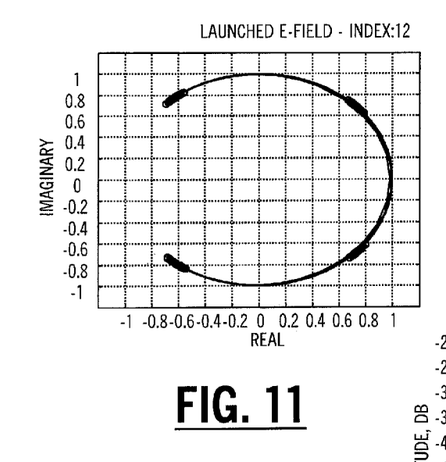
FIG. 11 is a graph of a complex plane of the launched E-field for a 4-PSK signal with a 5% underdrive RF drive level.
Figure 12:
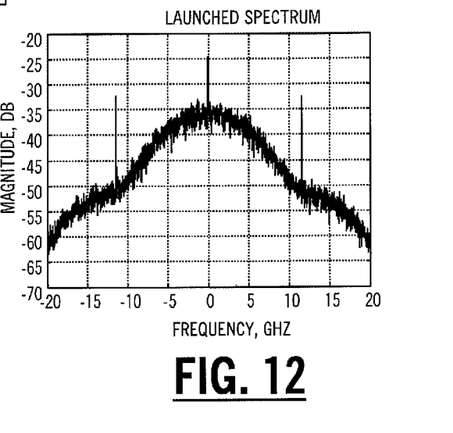
FIG. 12 is a graph of launched spectrum, frequency versus magnitude, showing the 4-PSK signal with a 5% underdrive RF drive level of FIG. 11.
Figure 13:
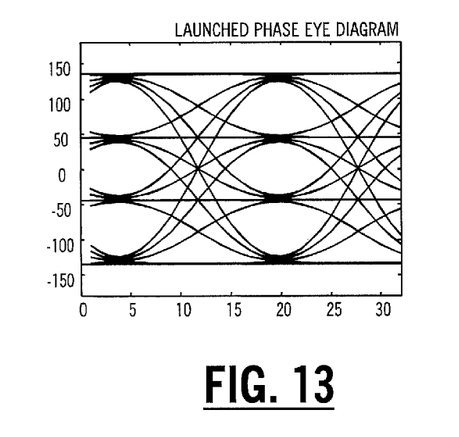
FIG. 13 is graph of the launched phase eye diagram showing the 4-PSK signal with a 5% underdrive RF drive level of FIG. 11.
Figure 14:
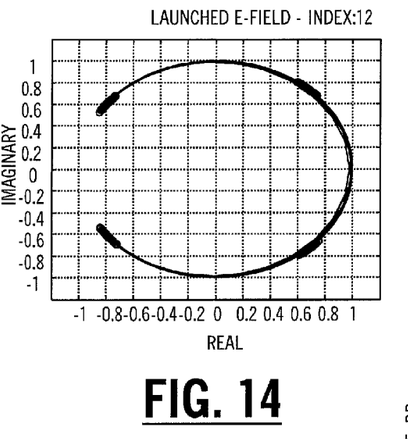
FIG. 14 is a graph of a complex plane of the launched E-field for a 4-PSK signal with a 5% overdrive RF drive level.
Figure 15:
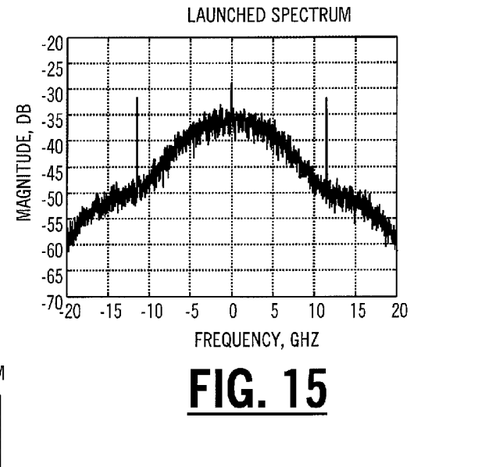
FIG. 15 is a graph of launched spectrum, frequency versus magnitude, showing the 4-PSK signal with a 5% overdrive RF drive level of FIG. 14.
Figure 16:
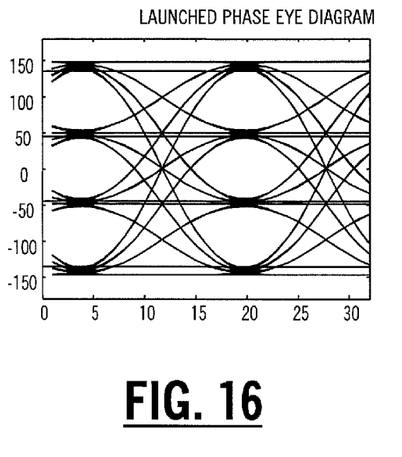
FIG. 16 is graph of the launched phase eye diagram showing the 4-PSK signal with a 5% overdrive RF drive level of FIG. 14.

Referring to FIGS. 8-16, in exemplary embodiments, various graphs illustrate exemplary RF drive level simulations of a 4-PSK signal. Referring to FIGS. 8, 9, and 10, in an exemplary embodiment, three graphs illustrate an ideal RF drive level simulation of a 4-PSK signal. Specifically, FIG. 8 is a complex plane of the launched E-field for a 4-PSK signal. FIG. 9 is a diagram of the launched spectrum, and FIG. 10 is a diagram of the launched phase eye diagram. Referring to FIGS. 11, 12, and 13, in an exemplary embodiment, three graphs illustrate a 5% underdrive RF drive level simulation of a 4-PSK signal. Specifically, FIG. 11 is a complex plane of the launched E-field for a 4-PSK signal. FIG. 12 is a diagram of the launched spectrum, and FIG. 13 is a diagram of the launched phase eye diagram. Referring to FIGS. 14, 15, and 16, in an exemplary embodiment, three graphs illustrate a 5% overdrive RF drive level simulation of a 4-PSK signal. Specifically, FIG. 14 is a complex plane of the launched E-field for a 4-PSK signal. FIG. 15 is a diagram of the launched spectrum, and FIG. 16 is a diagram of the launched phase eye diagram. FIGS. 11-16 illustrate the strong relationship between the carrier leakage level and the phase drive level in the exemplary embodiment of the 4-PSK signal. Specifically, the spectrum of FIG. 12 shows a higher carrier leakage level than FIG. 9 due to a lower RF drive level. FIG. 15 shows a lower carrier leakage level than FIG. 9 due to higher RF drive level.

Figure 17:
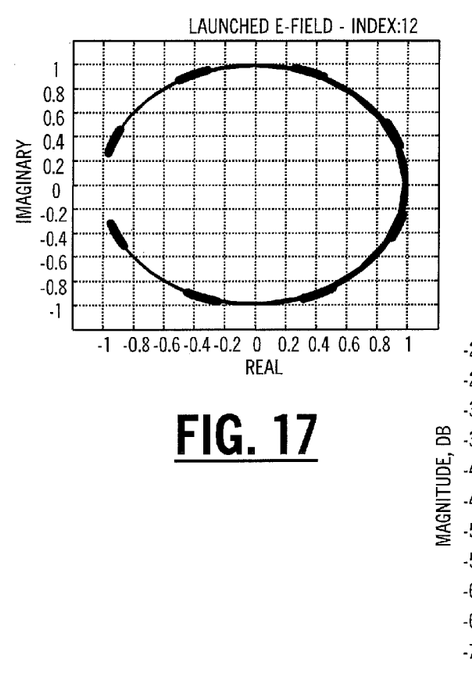
FIG. 17 is a graph of a complex plane of the launched E-field for an 8-PSK signal with a RF drive level.
Figure 18:
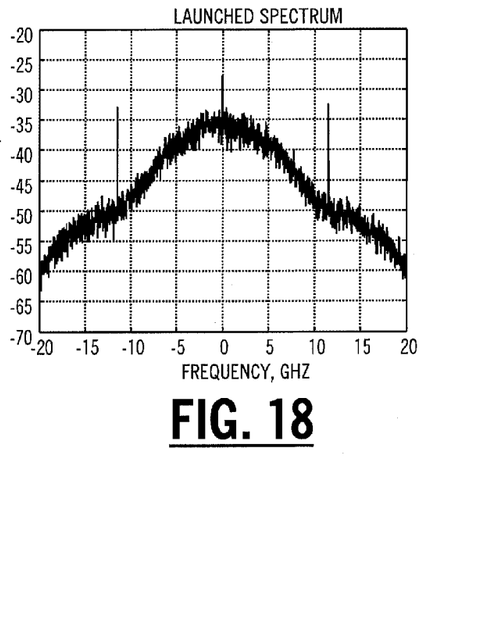
FIG. 18 is a graph of launched spectrum, frequency versus magnitude, showing the 8-PSK signal of FIG. 19.
Figure 19:
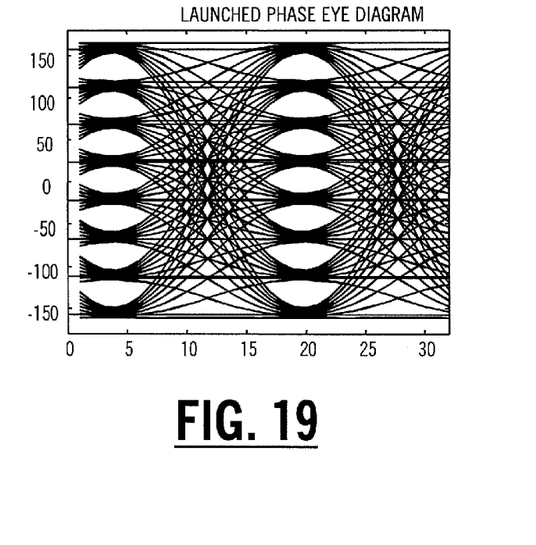
FIG. 19 is graph of the launched phase eye diagram showing the 8-PSK signal of FIG. 19.

Referring to FIGS. 17, 18, and 19, in an exemplary embodiment, three graphs illustrate an RF drive level simulation of an 8-PSK signal. Specifically, FIG. 17 is a complex plane of the launched E-field for an 8-PSK signal. FIG. 18 is a diagram of the launched spectrum, and FIG. 19 is a diagram of the launched phase eye diagram. As shown in FIG. 18, the 8-PSK signal also exhibits carrier leakage in a similar fashion as the 4-PSK signal illustrated in FIGS. 8-16. Thus, the 8-PSK signal may also utilize the same systems and methods described herein for measuring the carrier leakage for purposes of controlling the RD drive level.

Variously in FIGS. 1-19, the present invention including the RF drive level control method has been described based on linear electro-optic phase modulators. Of note, linear electro-optic phase modulators are those based entirely on the linear Pokel's effect. Linear electro-optic phase modulators are typically made in Lithium Niobate (LiNbO$_3$) or Gallium Arsenide (GaAs) semiconductors. In this case, the material refractive index and therefore modulated optical phase is directly proportional to the applied voltage. The present invention may be utilized as well with non-linear electro-optic phase modulators. In the case where the relationship between output optical phase to the applied voltage is non-linear, the carrier leakage measurement and associated control can be extended to control the phase modulator bias voltage in addition to the RF driving voltage.

Figure 20:
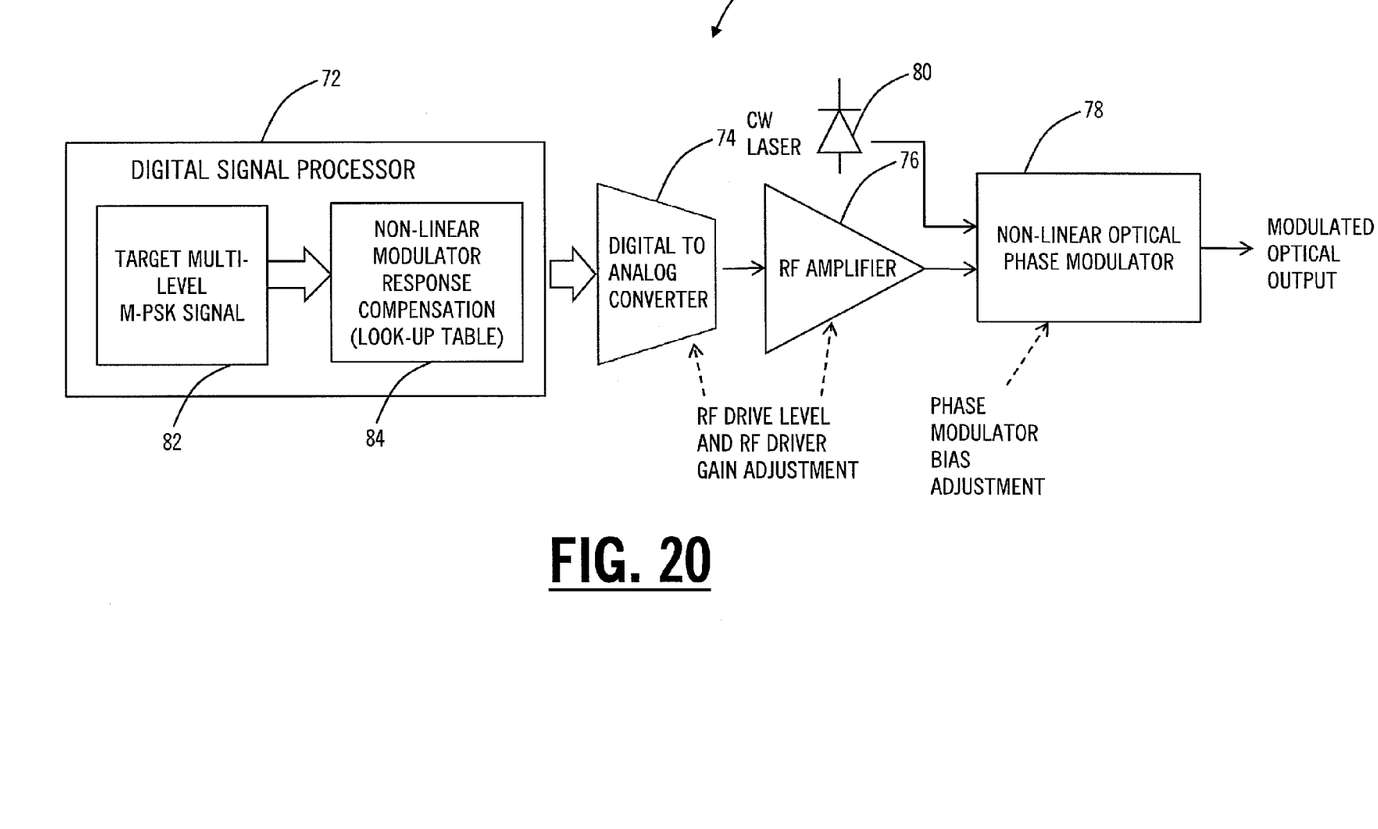
FIG. 20 is a block diagram of an exemplary non-linear electro-optic phase transmitter with carrier leakage control of RF drive level and phase modulator bias.

Referring to FIG. 20, in an exemplary embodiment, a block diagram illustrates an exemplary non-linear electro-optic phase transmitter 70 with carrier leakage control of RF drive level and phase modulator bias. In particular, the non-linear electro-optic phase transmitter 70 includes a digital signal processor (DSP) 72 coupled to a digital-to-analog converter (DAC) 74 coupled to an RF amplifier 76 that drives a non-linear optical phase modulator 78. A laser 80 also connects to the non-linear optical phase modulator 78 and is modulated by a drive signal provided by the DSP 72, the DAC 74, and the RF amplifier 76. The DSP 72 may include a target multi-level M-PSK signal 82 and a non-linear modulator response compensation look-up table 84.

As described herein, the carrier leakage control method outlined for RF drive level control on a linear electro-optic phase modulator/transmitter can be extended to control either the RF drive level or the modulator bias level of the non-linear electro-optic phase transmitter 70. In the exemplary embodiment of FIG. 20, a non-linear phase characteristic is compensated in the RF drive signal generation via the DSP 72. The non-linear electro-optic phase transmitter 70 the look-up table 84 in the DSP 72 ASIC followed by the DAC 74 to generate the multi-level RF drive signal with adjustments for the RF drive level, RF driver gain, and the phase modulator bias adjustment. Phase modulators with non-linear electro-optic effects are made in semiconductor materials such as Indium phosphide (InP) and Silicon (Si). Phase modulation in these materials can result from other effects from the linear Pokel's effect such as free carrier interaction, the Quantum confined Stark effect, and the Kerr effect. Due to these effects, there is generally a non-linear relationship between the modulated optical phase and applied driving voltage.

Figure 21:
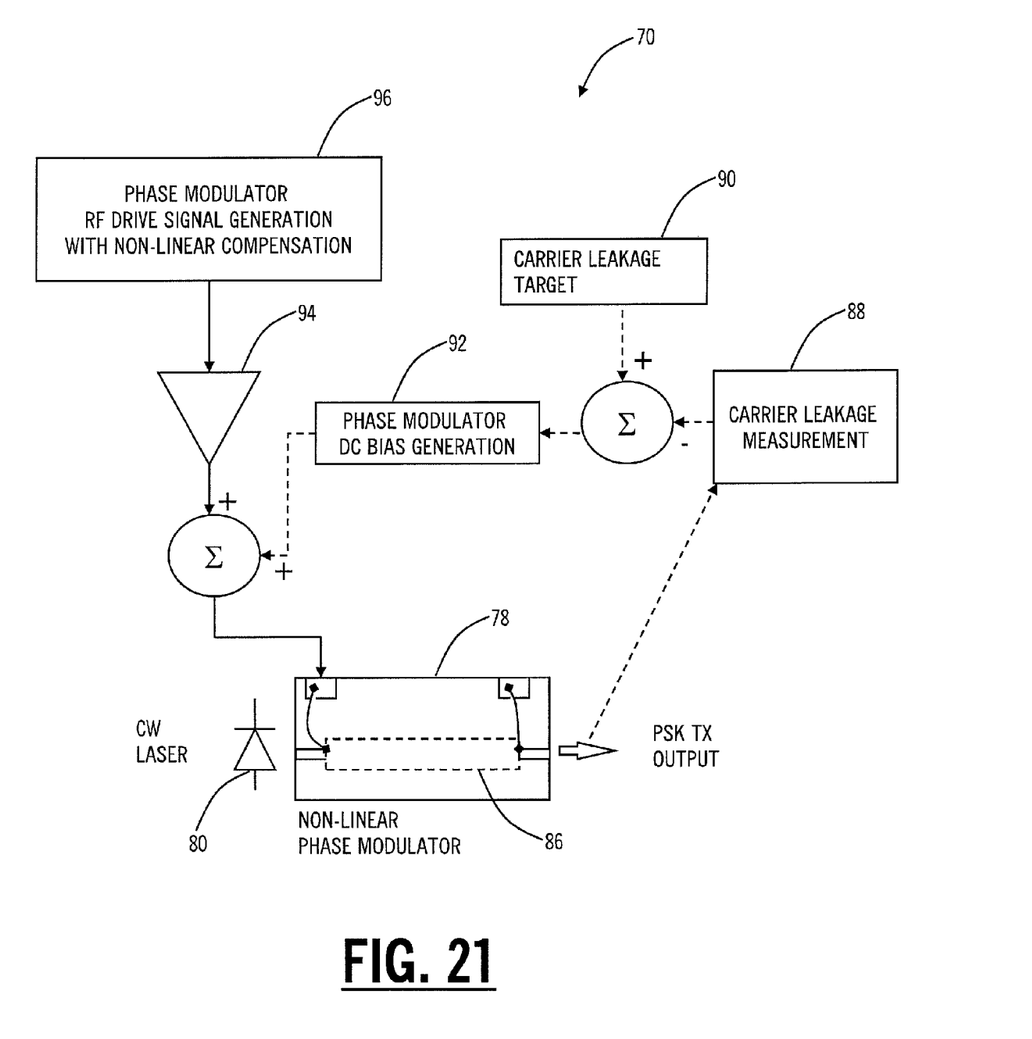
FIG. 21 is a block diagram of control of DC bias level using carrier leakage feedback of the non-linear optical phase modulator in the non-linear electro-optic phase transmitter.

Referring to FIG. 21, in an exemplary embodiment, a block diagram illustrates control of DC bias level using carrier leakage feedback of the non-linear optical phase modulator 78 in the non-linear electro-optic phase transmitter 70. The non-linear optical phase modulator 78 includes a non-linear phase modulator element 86 from which a carrier leakage measurement 88 is determined. The carrier leakage measurement 88 may be determined as described herein, and the carrier leakage measurement 88 is combined with a carrier leakage target 90 to generate a phase modulator DC bias 92. The phase modulator DC bias 92 is applied to a modulator driver 94 which is driven by a phase modulator RF drive signal with non-linear compensation 96, such as provided by the DSP 72.

Figure 22:
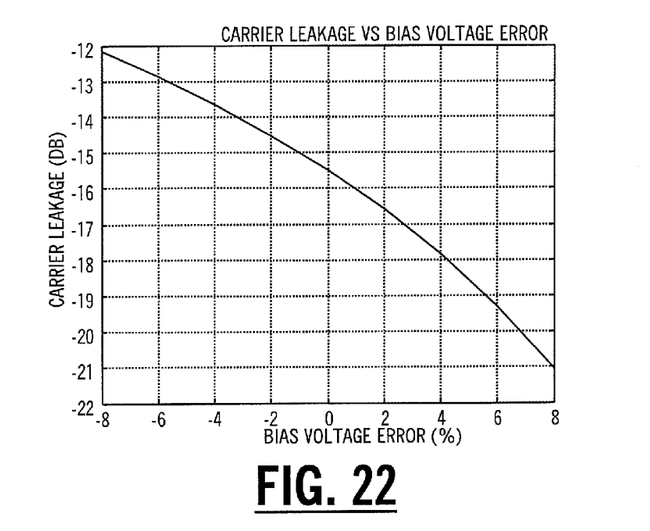
FIG. 22 is a graph of carrier leakage versus bias voltage error showing carrier leakage can be a strong indicator of modulator bias level for a modulator with a non-linear phase response.
Figure 23:
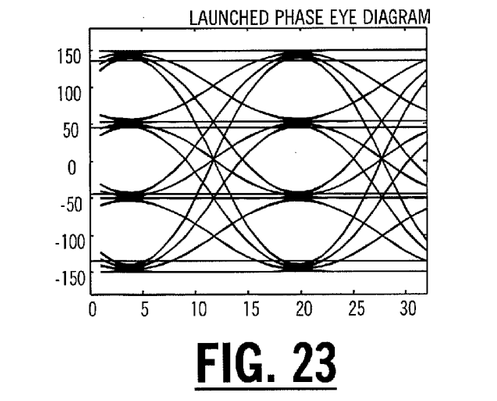
FIG. 23 is a graph of a launched phase eye diagram with an +8 bias error for a non-linear optical phase modulator.
Figure 24:
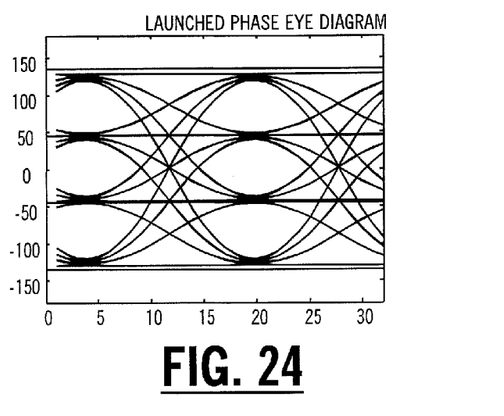
FIG. 24 is a graph of a launched phase eye diagram with an −8 bias error for a non-linear optical phase modulator.

Referring to FIGS. 22-24, in an exemplary embodiment, graphs exemplary RF drive level simulations of a non-linear 4-PSK signal showing control of a non-linear phase modulator's DC bias level using carrier leakage feedback. FIG. 22 is a graph of carrier leakage versus bias voltage error showing carrier leakage can be a strong indicator of modulator bias level for a modulator with a non-linear phase response. FIG. 23 is a graph of a launched phase eye diagram with an +8 bias error, and FIG. 24 is a graph of a launched phase eye diagram with an −8 bias error. In this example, under-bias results in too little phase modulation and over-bias results in too much phase modulation.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. A phase modulation method, comprising:
   phase modulating a laser source with a drive signal;
   measuring a carrier suppression ratio of an output of the phase modulated laser source;
   controlling the drive signal based upon the carrier suppression ratio;
   providing the laser source to a modulator;
   splitting a portion of the laser source prior to the modulator and providing the portion to a low frequency probe phase modulator;
   combining an output of the low frequency probe phase modulator with a portion of an output of the modulator;
   converting the combined output to an electrical signal; and
   determining modulation depth from the electrical signal, wherein the modulation depth is utilized to determine the carrier suppression ratio.

2. The phase modulation method of claim 1, wherein the drive signal comprises a M-ary Phase Shift Keying signal.

3. The phase modulation method of claim 1, further comprising:
   controlling the drive signal based on a difference between the modulation depth from a modulation depth target.

4. The phase modulation method of claim 1, wherein the carrier suppression ratio comprises a modulated time-averaged E-field divided by a magnitude of the E-field.

5. An electro-optic phase modulation system, comprising:
   a modulator;
   a modulator driver configured to drive the modulator with a Radio Frequency drive signal; and
   a drive level control circuit configured to monitor a portion of an output of the modulator and to control the Radio Frequency drive signal based thereon;
   wherein the Radio Frequency drive signal comprises a M-ary Phase Shift Keying signal;
   wherein the modulator is configured to measure a carrier suppression ratio; and
   wherein the carrier suppression ratio comprises a modulated time-averaged E-field divided by a magnitude of the E-field.

6. The electro-optic phase modulation system of claim 5, wherein the carrier suppression ratio is determined based on measured modulation depth.

7. The electro-optic phase modulation system of claim 6, wherein the modulator is configured to measure the measured modulation depth through optical interference.

8. The electro-optic phase modulation system of claim 5, wherein the modulator comprises:
   a first splitter configured to split a laser source to a phase modulator and a low frequency probe;
   a second splitter configured to split an output of the phase modulator to a modulator output and a combiner;
   the combiner configured to combine an output of the low frequency probe and the split output of the phase modulator; and
   a photodiode connected to the combiner providing an electrical signal to the drive level control circuit.

9. The electro-optic phase modulation system of claim 8, wherein the drive level control circuit is configured to determine modulation depth from the electrical signal and compare the modulation depth to a target depth for controlling the Radio Frequency drive signal.

10. An M-ary Phase-Shift Keying transmitter, comprising:
    a laser source;
    a phase modulator configured to modulate the laser source based on a Radio Frequency drive signal;
    a feedback control circuit configured to control the Radio Frequency drive signal based upon carrier leakage at an output of the phase modulator;
    a first splitter configured to split the laser source to the phase modulator and a low frequency probe;
    a second splitter configured to split an output of the phase modulator to a transmitter output and a combiner;
    the combiner configured to combine an output of the low frequency probe and the split output of the phase modulator; and
    a photodiode connected to the combiner providing an electrical signal to the feedback control circuit.

11. The M-ary Phase-Shift Keying transmitter of claim 10, wherein the phase modulator comprises a non-linear phase modulator.

12. The M-ary Phase-Shift Keying transmitter of claim 11, wherein the feedback control circuit is further configured to control bias voltage of the non-linear phase modulator.

* * * * *